United States Patent Office 3,544,682
Patented Dec. 1, 1970

3,544,682
FUNGICIDAL CONTROL METHOD EMPLOYING SUBSTITUTED PYRAZINES
Harold M. Taylor and Howard E. Holden, Indianapolis, Ind., assignors to Eli Lilly and Company, Indianapolis, Ind., a corporation of Indiana
No Drawing. Filed Mar. 18, 1968, Ser. No. 714,101
Int. Cl. A01n 9/22
U.S. Cl. 424—250          7 Claims

ABSTRACT OF THE DISCLOSURE

Fungi which damage useful plants are controlled by applying substituted pyrazines or nonphytotoxic acid addition salts thereof to the locus of the fungi.

BACKGROUND OF THE INVENTION

Both food crops and ornamental plants are attacked and seriously damaged by plant pathogenic fungi. Much effort has therefore been expended in attempting to find and provide substances and compositions which will effectively control said fungi.

In the prior art, Behun et al., Jour. Org. Chem., 26, 3379 (1961) teach the synthesis of 2-diphenylmethylpyrazine; however, there is no teaching of utility for the compound.

Klein et al., Jour. Org. Chem., 29, 2623 (1964) teach only the method of synthesis of 2-ethoxy-3-pyrazinemethanol. No utility is alleged for the compound.

Rutner et al., Jour. Org. Chem., 28, 1898 (1963) teach the preparation of pyrazylmethanol; but no utility is alleged therefor.

Akkerman et al., Neth. 105,432 (July 15, 1963) teach the preparation of $\alpha,\alpha$ - diphenyl-2-pyrazineacetronitrile and $\alpha,\alpha$-diphenyl-2-pyrazineacetamide, which compounds are alleged to possess sedative and anticonvulsant properties.

Hirschberg et al., Jour. Heterocyclic Chem., 2, 209 (1965) teach the preparation of 2 - (3,6 - dimethylpyrazinyl)-phenylcarbinol and homologues. However, no utility for the compounds is taught.

The present invention relates to methods and compositions for the control of plant pathogenic fungi utilizing substituted pyrazines as the fungicidally active materials.

SUMMARY

It is an object of this invention to provide methods and compositions for controlling plant pathogenic fungi.

In fulfillment of this object, this invention provides a novel process which comprises applying to a locus of fungi a fungicidal amount of one or more substituted pyrazines of the class represented by the formula:

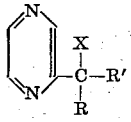

wherein

R is phenyl, thienyl, furyl, benzyl, $C_1$–$C_{10}$ alkyl, or $C_3$–$C_8$ cycloalkyl;
R' is R or hydrogen;
X is hydrogen, hydroxyl, cyano, carboxamido, halo, mercapto, $C_1$–$C_3$ alkoxy, $C_1$–$C_3$ alkylmercapto, amino, $C_1$–$C_3$ alkyl amino, or di($C_1$–$C_3$ alkyl)amino; and
The nonphytotoxic acid addition salts formable therewith.

In the above formula, $C_1$–$C_{10}$ alkyl can be any branched or straight chain saturated hydrocarbon radical such as methyl, ethyl, n-propyl, isopropyl, n-butyl, isobutyl, sec.-butyl, tert.-butyl, n-amyl, isoamyl, sec.-amyl, tert.-amyl, n-hexyl, isohexyl, sec.-hexyl, n-heptyl, isoheptyl, sec.-heptyl, n-octyl, isooctyl, sec.-octyl, n-nonyl, isononyl, n-decyl, isodecyl, and the like.

$C_3$–$C_8$ cycloalkyl refers to a monocyclic, saturated hydrocarbon and includes cyclopropyl, cyclobutyl, cyclopentyl, cyclohexyl, cycloheptyl, and cyclooctyl.

Halo refers to the halogens, which include chlorine, bromine, iodine, and fluorine.

$C_1$–$C_3$ alkoxy refers to methoxy, ethoxy, n-propoxy, and isopropoxy.

$C_1$–$C_3$ alkylmercapto refers to methylmercapto, ethylmercapto, n-propylmercapto, and isopropylmercapto.

$C_1$–$C_3$ alkylamino refers to methylamino, ethylamino, n-propylamino, and isopropylamino.

Di($C_1$–$C_3$ alkyl)amino refers to dimethylamino, methylethylamino, methylpropylamino, ethylpropylamino, diethylamino, di-n-propylamino, and diisopropylamino.

Suitable nonphytotoxic acid addition salts of those compounds coming within the scope of the generic formula, supra, and sufficiently basic to allow formation of such salts can be prepared employing, for example, the following acids: hydrochloric, hydrobromic, sulfuric, phosphoric, nitric, oxalic, p-toluenesulfonic, benzenesulfonic, methanesulfonic, maleic, and the like. It will be understood by those skilled in the art that suitable salts include those which are not substantially more phytotoxic than the free bases from which they are derived.

Compounds coming within the scope of the generic formula, supra, include, but are not limited to the following:

2-di(p-tolyl)methylpyrazine
$\alpha,\alpha$-Di(p-tolyl)-2-pyrazinemethanol
$\alpha,\alpha$-Dicyclohexyl-2-pyrazinemethanol
$\alpha$-Methyl-$\alpha$-phenyl-2-pyrazinemethanol
$\alpha$-Cyclopentyl-$\alpha$-phenyl-2-pyrazinemethanol
$\alpha,\alpha$-Di-n-butyl-2-pyrazinemethanol
$\alpha$-Cyclobutyl-$\alpha$-(p-tolyl)-2-pyrazinemethanol
2-di(n-butyl)methylpyrazine
$\alpha,\alpha$-Dicyclopropyl-2-pyrazinemethanol
$\alpha,\alpha$-Diphenyl-2-pyrazinemethylchloride
$\alpha,\alpha$-Dicyclooctyl-2-pyrazinemethanol
$\alpha$-(2-thienyl)-$\alpha$-phenyl-2-pyrazinemethanol
$\alpha,\alpha$-Dicycloheptyl-2-pyrazinemethanol
$\alpha$-(2-furyl)-$\alpha$-(p-tolyl)-2-pyrazinemethanol
$\alpha$-Phenyl-$\alpha$-(4-chlorophenyl)-2-pyrazinemethanol
$\alpha$-Benzyl-$\alpha$-phenyl-2-pyrazinemethanol
$\alpha,\alpha$-(2-chlorophenyl)-2-pyrazinemethanol
$\alpha,\alpha$-Di(2-thienyl)-2-pyrazinemethanol
$\alpha$-Phenyl-$\alpha$-(2-thienyl)-2-pyrazinemethanol
2-di(2-thienyl)methylpyrazine
$\alpha,\alpha$-(4-chlorophenyl)-2-pyrazinemethanol
$\alpha$-Methyl-$\alpha$-phenylmethylpyrazine
2-di(2-furyl)methylpyrazine
$\alpha$-n-Heptyl-$\alpha$-phenylmethylpyrazine
2-di(n-octyl)methylpyrazine
2-di(n-nonyl)methylpyrazine
2-($\alpha$-ethoxydiphenylmethyl)pyrazine
2-($\alpha$-methoxydiphenylmethyl)pyrazine
2-($\alpha$-methylthiodiphenylmethyl)pyrazine
2-($\alpha$-propoxydiphenylmethyl)pyrazine
2-[$\alpha$-(methylethylamino)diphenylmethyl]pyrazine hydrobromide
2-($\alpha$-ethylthiodiphenylmethyl)pyrazine
2-($\alpha$-diethylaminodiphenylmethyl)pyrazine phosphate
2-($\alpha$-aminodiphenylmethyl)pyrazine hydrochloride
2-($\alpha$-ethylaminodiphenylmethyl)pyrazine sulfate
2-($\alpha$-dimethylaminodiphenylmethyl)pyrazine sulfate,
and the like.

While the compounds useful in the present invention have been defined in terms of a structural formula which depicts the structural features of the compounds used and which indicates the presence therein of certain well-known organic radicals, including alkyl, cycloalkyl, phenyl, thienyl, furyl, and benzyl, it will be recognized by those skilled in the art that such radicals may bear one or more substituents without departing in any way from the spirit of the invention and without altering the properties of the compounds in such a way as would set them apart from the invention or take them outside its scope. Compounds having the structure depicted by the generic formula, supra, and bearing such substituents are accordingly considered as equivalents of the unsubstituted compounds. Among such substituent atoms and radicals are halo, hydroxy, nitro, lower alkyl, trifluoromethyl, methoxy, methylmercapto, cyano, hydroxymethyl, $\beta$-hydroxyethyl, acetyl, acetamido, and the like.

Certain of the compounds useful in the novel fungicidal process of this invention can be synthesized by the preparative method taught by Akkerman et al., Netherlands 105,432 (July 15, 1963). For example, diphenylacetonitrile is allowed to react with 2-chloropyrazine in the presence of sodium amide in a suitable inert solvent such as toluene to yield $\alpha,\alpha$-diphenyl-2-pyrazineacetonitrile. In the same manner, diphenylmethane is allowed to react with 2-chloropyrazine to yield 2-diphenylmethylpyrazine.

Hydrolysis of $\alpha,\alpha$-diphenyl-2-pyrazineacetonitrile to the corresponding amide, $\alpha,\alpha$-diphenyl-2-pyrazineacetamide, is readily accomplished by refluxing the acetonitrile with an aqueous inorganic acid, such as hydrochloric or sulfuric as taught by Akkerman et al., supra.

Other of the compounds are readily synthesized by methods well known to the art. For example, 2-carbethoxypyrazine is allowed to react with a suitable Grignard reagent such as phenyl magnesium bromide to yield $\alpha,\alpha$-diphenyl-2-pyrazinemethanol. The crude reaction product mixture is dissolved in benzene and subjected to chromatography over a Florisil column, elution being accomplished using a mixture of benzene-ethyl acetate. The combined eluate is evaporated to dryness and the residue recrystallized from a suitable solvent such as methanol-water to yield $\alpha,\alpha$-diphenyl-2-pyrazinemethanol.

A modification of the preparative method taught by Behun et al., Jour. of Org. Chem., 26, 3379 (1961) can also be used to prepare compounds useful in the process. For example, one mole of 2-methylpyrazine is allowed to reaction with two moles of sodium amide in liquid ammonia. One mole of bromobenzene is added to the mixture followed by an additional two moles of sodium amide. The reaction product mixture is distilled to yield 2-diphenylmethylpyrazine.

The nonphytotoxic acid addition salts are readily prepared from those compounds possessing basic substituents by methods well known to the art. The free base is dissolved in ether, the solution cooled and saturated with, for example, anhydrous hydrogen chloride gas. The hydrochloric acid addition salt of the substituted pyrazine which precipitates is filtered off and purified by recrystallization.

In carrying out the method of the present invention, compositions containing the active ingredient are applied to the infected or susceptible plant surfaces or to the soil wherein the plants grow. A convenient and preferred method is to spray the plant surfaces or the soil surface with a liquid dispersion or emulsion of the active ingredient.

The compositions of the present invention desirably contain in addition to the substituted pyrazine antifungal one or more of a plurality of additaments including water, polyhydroxy compounds, petroleum distillates, and other dispersion media, surface-active dispersing agents, emulsifiers, and finely divided inert solids. The concentration of the substituted pyrazine antifungal in these compositions may vary depending on whether the composition is intended for direct application as a dust to plants or is intended as an emulsifiable concentrate or a wettable powder designed to be subsequently diluted with additional inert carrier such as water to produce the ultimate treating composition.

The compounds used in the present invention are applied to the locus of the fungi, i.e., plants or soil, in effective amounts, varying somewhat with the severity of the fungus infection and with other factors such as the environment in which treatment is conducted. In general, it will be found that an aqueous spray containing from about 16 to about 400 p.p.m. of active material is satisfactory when treatment is to be carried out in the greenhouse.

As is well understood in the art, a somewhat higher concentration of the fungicide is desirable when treatment is to be carried out in the field. In that case, the preferred range is from about 80 to about 600 p.p.m. of active ingredient.

Treating compositions are most conveniently formulated by preparing liquid or solid concentrates, which are subsequently diluted to the desired level for use. Emulsifiable liquid concentrates can be prepared by incorporating from about 1 to about 10 percent of the active ingredient and an emulsifying agent in a suitable water-immiscible organic liquid. Such concentrates may be further diluted with water to form spray mixtures in the form of emulsions. Such spray compositions then comprise active toxicant, water-immiscible solvent, emulsifying agent, and water. Suitable emulsifying agents can be of the nonionic or ionic types or blends thereof, and include condensation products of alkylene oxides with phenols and organic acids, polyoxyethylene derivatives of sorbitan esters, complex ether-alcohols, ionics of the aralkyl sulfonate type, and the like. Suitable organic liquids to be employed include aromatic hydrocarbons, aliphatic hydrocarbons, cycloaliphatic hydrocarbons, and mixtures thereof such as petroleum distillates.

Solid concentrate mixtures can be prepared by incorporating from about 10 to about 50 percent of the substituted pyrazine methanol compound in an inert finely divided solid carrier such as bentonite, fuller's earth, diatomaceous earth, hydrated silica, diatomaceous silica, expanded mica, talc, chalk, and the like. Such concentrates can be formulated, if desired, for direct use as dusting compositions, or can be diluted, if desired, with additional inert solid carriers to produce dusting powders containing around 1 to 2 percent by weight of the substituted pyrazine. Alternatively, dispersing and/or wetting agents can be incorporated along with the substituted pyrazine in the solid carrier to form wettable powder concentrates ranging from 10 to 25 percent concentration which subsequently can be dispersed in water or other aqueous carrier to form spray compositions. Suitable wetting and emulsifying agents include sodium lignosulfate, sulfonate-oxide condensate blends, sulfonated nonionic blends, anionic wetting agents, and the like.

Further, the substituted pyrazine toxicant can be incorporated in solutions, simple dispersions, aerosol formulations, and other media adaptable to be employed for treating vegetation.

In operating according to the method of the present invention, the antifungal composition is applied to infected or susceptible plant surfaces in any convenient fashion such as spraying, dusting, dipping, or drenching. A spray method is considered preferable, especially when large numbers of plants are involved, because of the rapidity and uniformity of treatment possible. In spraying, it is usually sufficient for the infected or susceptible surfaces to be thoroughly wet with the liquid dispersion employed. Good results have been obtained by employing spray compositions whether they be emulsions or aqueous dispersions of solid concentrates.

EXAMPLE 1

The evaluation of the effectiveness of compounds exemplified by the above formula against *Erysiphe polygoni*, the causative organism of beam powdery mildew, was accomplished in the greenhouse in the following manner.

Fungicidal compositions were prepared by dissolving 40 mg. of the compound to be tested in 1 ml. of a solution of cyclohexanone containing 55 mg. of sulfonate nonionic blend and diluting to a volume of 100 ml. with water. This composition then contained 400 p.p.m. of fungicide. To prepare a composition containing 1000 p.p.m., 100 mg. of the compound to be tested was dissolved in 1 ml. of the cyclohexanone-sulfonate nonionic blend solution and then diluted to a volume of 100 ml. with water.

Three bean seeds (Kentucky Wonder variety) were planted in 4-inch clay pots and allowed to germinate. The plants were then thinned to two plants per pot. Ten days after the day of planting the seeds, the test chemicals, compounded as described above, were sprayed on all leaf surfaces of the bean plants and allowed to dry. The plants were then placed in the greenhouse and Kentucky Wonder beans heavily infected with powdery mildew were placed above them for about five days, after which they were removed. At the end of five additional days (twenty days after planting), the plants were observed for development of the disease. The appearance of the treated plants was compared with that of untreated plants and ratings of the control of the fungus were recorded. The control rating scale used was as follows:

0—no disease control
1—slight disease control
2—moderate disease control
3—good disease control
4—complete disease control, no symptoms of the fungus present Chart 1, which follows, shows the results of the testing of several substituted pyrazines against *Erysiphe polygoni*. In the chart, Column 1 gives the name of the compound; Column 2, the rate in terms of p.p.m. at which the compound was applied to the test plants; and Column 3, the protection rating of the compound.

CHART 1

| Compound | Application rate in p.p.m. | Control rating |
|---|---|---|
| α,α-Diphenyl-2-pyrazine-methanol | 400 | 4 |
|  | 80 | 4 |
|  | 16 | 2 |
| α,α-Bis(4-chlorophenyl)-2-pyrazinemethanol | 400 | 4 |
|  | 80 | 3+ |
|  | 16 | 4 |
|  | 3.2 | 2– |
| α,α-Diphenyl-2-pyrazine-acetonitrile | 400 | 4 |
|  | 80 | 4 |
|  | 16 | 3 |
|  | 3.2 | 1 |
| 2-diphenylmethylpyrazine | 400 | 4 |
|  | 80 | 3+ |
|  | 16 | 3+ |
|  | 3.2 | 1 |
| α,α-Diphenyl-2-pyrazine-acetamide | 400 | 4 |
|  | 80 | 3 |
|  | 16 | 2 |
| 2-benzylpyrazine | 400 | 2– |
| 2-(α-cyclohexylbenzyl)pyrazine | 400 | 4 |
|  | 80 | 4 |
|  | 16 | 4 |
|  | 3.2 | 2 |
| 2-(n-hexyl)pyrazine | 400 | 2– |
| 2-(cyclohexylmentyl)-pyrazine | 400 | 2– |
| 2-dicyclohexylmethylpyrazine | 400 | 4 |
|  | 80 | 3 |
|  | 16 | 3 |
|  | 3.2 | 3 |
| 2-(dibenzylmethyl)-pyrazine | 400 | 2– |
| 2-[bis(4-chlorobenzyl)-methyl]pyrazine | 400 | 4 |
|  | 80 | 3 |
|  | 16 | 3 |
|  | 3.2 | 2 |
| 2-(1-cyclohexyl-n-hexyl)-pyrazine | 400 | 2– |
| α,α-(2-chlorophenyl)-2-pyrazine methanol | 400 | 4 |

EXAMPLE 2

The following experimental procedure was used to demonstrate the efficacy of certain compositions of this invention to inhibit the growth of *Uromyces phaseoli* var. *typica*, the causative organism of bean rust.

Bean plants were grown from seeds planted in sand contained in 4-inch plastic pots, three bean seeds of the Pinto variety being planted in each pot.

On the tenth day after planting, the bean plants were infected by spraying the foliage with a spore suspension of *Uromyces phaseoli* var. *typica*.

The compound to be tested dissolved in a mixture of aqueous 1 percent cyclohexanone as a solvent and aqueous 0.1 percent Tween 20 (polyoxyethylene sorbitan monooleate) as a surfactant to give a concentration of test compound of 400 p.p.m. A 5-ml. portion of this solution was placed in a test tube and diluted to a volume of 50 ml. with aqueous 0.085 percent sodium chloride solution to give a concentration of test compound of 40 p.p.m. The sodium chloride solution was used to provide an isotonic medium for the plants. A bean plant was removed from the sand in a pot, the roots washed with water and the plant placed in a test tube containing a solution of the compound being tested. The plants in the test tubes were placed in the greenhouse for a period of 10 days. During this time, the roots of each plant were aerated for about 10 to 15 minutes four times daily by introducing air into the bottom of the test tube via a capillary tube. At the end of 10 days, the plants were examined for evidence of the development of bean rust and compared with two plants which had been inoculated with *Uromyces phaseoli* var. *typica* and placed in test tubes containing all ingredients except the test chemicals. The control rating scale used is the same for Example 1. Results are set forth in Chart 2.

CHART 2

| Compound | Application rate in p.p.m. | Control rating |
|---|---|---|
| α,α-Diphenyl-2-pyrazine-methanol | 40 | 4 |
|  | 20 | 3.5 |
|  | 10 | 2.5 |
|  | 5 | 1 |
| 2-(dibenzylmethyl)pyrazine | 40 | 2 |

EXAMPLE 3

The following experimental procedure was used to demonstrate the efficacy of certain compositions of this invention to inhibit the growth of *Piricularia oryzae*, the causative organism of rice blast.

Four-inch plastic pots containing a sterilized mixture of half sand and half soil were thickly seeded with rice seed. Fourteen days from the day of planting the test chemical was sprayed on all leaf surfaces and allowed to dry. On the same day, the foliage was inoculated with a water suspension of conidia, applied with a De Vilbiss sprayer, and all the pots placed in a cart moist chamber at 67° F. for a period of 40 hours. At the end of the 40-hour period, the pots were returned to the greenhouse. After six days in the greenhouse, the plants were observed for development of the characteristic symptoms of the blast disease. Each test included two pots sprayed with the diluted solvent-emulsifier solution followed by inoculation as above; and one pot of rice plants sprayed with a commercially available fungicide, manganese ethylene bisdithiocarbamate, formulated by the procedure used for the test chemicals. The symptoms of the blast disease appearing on the treated plants were compared with the check plants and rated for the control of the fungus achieved. The control rating scale is the same as in Example 1. The results are set forth in Chart 3.

CHART 3

| Compound | Application rate in p.p.m. | Control rating |
|---|---|---|
| 2-(dibenzylmethyl)-pyrazine | 400 | 3 |
| α,α-Diphenyl-2-pyrazine-methanol | 400 | 3 |

EXAMPLE 4

The following experimental procedure was used to demonstrate the efficacy of certain compositions of this invention to inhibit the growth of *Verticillium albo-atrum*, the causative organism of verticillium wilt of tomato.

Sufficient sterilized soil to fill twenty 4-inch diameter pots was thoroughly mixed with 50 ml. of autoclaved wheat seed heavily infested with *Verticillium albo-atrum*, which specifically incites wilt of tomato plants. The fungus was allowed to grow through the soil for several days. The soil was screened to remove organic debris and diluted with an equal volume of sterile soil.

Fourteen and one-tenth milligrams of compounds to be tested, a treatment equivalent to a broadcast rate of 40 lb./acre was weighed into a jar and dissolved in 0.5 ml. of a solution composed of equal parts of acetone and ethanol. This solution was diluted to 5 ml. with aqueous 0.1 percent Tween 20 (polyoxyethylene sorbitan monooleate), and 3 g. of granulated diatomaceous earth (30–60 mesh) was added to the solution to act as a carrier. To the jar and contents was added 150 g. of infested soil, the jar placed on a roller for about 3 minutes to thoroughly incorporate the test chemical into the soil. After the mixing was complete, the jar caps were unscrewed to a loose fit to allow the volatile chemical fumes to escape, and the jars were placed in a humidity-temperature controlled growth cubicle in the greenhouse for five days.

At the end of five days, the contents of the jar were transferred to a 3-inch square pot and a tomato plant, variety Bonny Best, ca. 4–5 inches tall, was transplanted into the soil in the pot as an indicator plant. Controls of infested, untreated soil and uninoculated sterile soil were run in each test. Results were determined when the leaves of the infested checks had wilted to the extent of 75 percent. The control rating scale is the same as for Example 1. The results are set forth in Chart 4.

CHART 4

| Compound | Application rate, lb./acre | Control rating |
|---|---|---|
| 2-(1-phenyl-n-hexyl)-pyrazine | 40 | 2 |
| 2-(n-hexyl)pyrazine | 40 | 3 |
| 2-cyclohexylmethylpyrazine | 40 | 3 |
| 2-(1-pentyl)-n-hexylpyrazine | 40 | 3 |

EXAMPLE 5

The following experimental procedure was used to demonstrate the efficacy of certain compositions of this invention to inhibit the growth of *Rhizoctonia solani*, the fungal pathogen inciting damping-off to cucumber.

The chemical compounds were tested at a broadcast rate of 40 lb./acre, and were weighed out (141 mg.) and incorporated into fungus-infested test soil in a manner identical to that described in Example 4, supra. The fungus-infested soil, containing the test compound was placed in 3-inch square pots and each pot planted to 10 cucumber seeds, variety Green Prolific, and the planted pots placed on a cart in the greenhouse. The plants were allowed to grow about 2 to 3 weeks, at which time they were examined and the disease ratings recorded as shown in Chart 5. The control rating scale is the same as that used in Example 1.

CHART 5

| Compound | Application rate, lb./acre | Control rating |
|---|---|---|
| 2-(1-phenyl-n-hexyl)-pyrazine | 40 | 3 |
| 2-benzylpyrazine | 40 | 4 |

EXAMPLE 6

The following experimental procedure was used to demonstrate the efficacy of certain compositions of this invention to inhibit the growth of *Pythium aphanidermatum*, the causative agent of Pythium damping-off of cotton.

Enough sterilized soil to fill twenty 4-inch pots was thoroughly mixed with 100 ml. of wheat seed infested with *Pythium aphanidermatum*. The fungus is allowed to grow through the soil for several days. The soil was then screened to remove infested seeds and other organic debris and diluted with an equal volume of sterile soil.

Fourteen and one-tenth milligrams of compound to be tested, a treatment equivalent to a broadcast rate of 40 lb./acre was weighed into a jar and dissolved in 0.5 ml. of a solution composed of equal parts of acetone and ethanol. The solution was diluted to 5 ml. with aqueous 0.1 percent Tween 20 (polyoxyethylene sorbitan monooleate) and 3 g. of granulated diatomaceous earth (30–60 mesh) was added to the solution to act as a carrier. To the jar and contents were added 150 g. of Pythium infested soil, and the jar was tightly capped and placed on a roller for about 3 minutes to thoroughly incorporate the test compound into the soil. After the mixing was complete, the treated, infested soil was immediately transferred to a 3-inch square pot, planted to 10 cotton seeds, variety Coker 100A, and placed on a greenhouse cart. The pots were then covered with a polyethylene cover and placed in a temperature-humidity controlled growth room. After 72 hours, the cover was removed and the cotton seedlings allowed to grow for about 2 to 3 weeks, at which time the seedlings are old enough to show damping-off symptoms. The plants are examined for symptoms of the disease and compared with controls. The results are presented in Chart 6. The control rating scale is the same as that used in Example 1.

CHART 6

| Compound | Application rate, lb./acre | Control rating |
|---|---|---|
| 2-(1-phenyl-n-hexyl)-pyrazine | 40 | 4 |
| 2-benzylpyrazine | 40 | 3 |
| 2-(n-hexyl)pyrazine | 40 | 1 |

PREPARATION 1

α,α-Diphenyl-2-pyrazinemethanol

To the ether solution of the Grignard reagent prepared from 2.4 g. (0.1 g.-atom) of magnesium and 15.7 g. (0.1 mole) of bromobenzene in 100 ml. of anhydrous ether was added dropwise a solution of 7.5 g. (0.05 mole) of 2-carbethoxypyrazine in 50 ml. of anhydrous ether. The reaction product mixture was refluxed for about one-half hour, cooled to room temperature and poured onto a mixture of crushed ice and an exces of 5 N aqueous hydrochloric acid. The aqueous-organic mixture was filtered to remove a small amount of dark colored solid. The filtrate was extracted with four 100-ml. portions of ether, the combined ether extracts dried and the ether solvent removed in vacuo leaving an oil. The oil was chromatographed over a Florisil column, the column being eluted with benzene-ethylacetate mixture. The fraction obtained from the column using benzene containing 5 percent ethyl acetate had a melting point of about 117° C. after recrystallization from a mixture of methanol and water, and was identified by elemental analysis and n.m.r. spectrum as α,α-diphenyl-2-pyrazinemethanol.

Following this same procedure and using appropriate starting materials the following compounds were prepared:

α,α-Bis(4-chlorophenyl)-2-pyrazinemethanol. M.P.=117° C.

α,α-Bis(2-chlorophenyl)-2-pyrazinemethanol. M.P.=116–117° C.

PREPARATION 2

2-diphenylmethylpyrazine

To approximately 1500 ml. of liquid ammonia was added 39 g. (1.0 mole) of sodium amide followed by the dropwise addition of 47.0 g. (0.5 mole) of 2-methylpyrazine. The red reaction mixture was stirred for about 15 minutes after the addition was complete, cooled to about −50° C. and 78.6 g. (0.5 mole) of bromobenzene added. Another 39 g. (1.0 mole) of sodium amide was added over a period of about one-half hour, and stirring was continued for an additional one-half hour.

One hundred-forty grams of ammonium chloride and 300 ml. of ethyl ether were added to the reaction product mixture, the mixture warmed to refluxing, and poured over crushed ice. The resulting mixture was acidified with aqueous concentrated hydrochloric acid, extracted successively with ether, and the aqueous layer discarded. The ether extracts were combined, dried, evaporated, and distilled at reduced pressure to yield two fractions.

Fraction A had a boiling point of about 102–110°/1 mm. and was identified as 2-benzylpyrazine.

Fraction B had a boiling point of about 170–175°/0.8 mm. It crystallized on standing and on recrystallization from ethanol had a melting point of about 106–107°, and was identified as 2-diphenylmethylpyrazine.

PREPARATION 3

α,α-Diphenyl-2-pyrazineacetonitrile

A solution of 7.75 g. (0.04 mole) of diphenylacetonitrile in 15 ml. of dry toluene was added to a suspension of 2.0 g. (0.05 mole) of sodium amide in 7 ml. of dry toluene. The mixture was refluxed for about 2 hours, cooled to about 70° C., and 5.75 g. (0.05 mole) of 2-chloropyrazine added dropwise. The reaction mixture was refluxed for about 3 hours, cooled, the reaction product mixture poured onto crushed ice, and extracted several times with ethyl ether. The combined ether extracts were dried and the solvent evaporated to dryness in vacuo. The residue was recrystallized from boiling methanol to yield crystalline product weighing about 3.11 g. and having a melting point of about 100–102° C. It was identified by elemental analysis and infrared and nuclear magnetic resonance (n.m.r.) spectra as α,α-diphenyl-2-pyrazineacetonitrile.

PREPARATION 4

α,α-Diphenyl-2-pyrazineacetamide

To 12 ml. of concentrated sulfuric acid heated to a temperature of about 90° C. was added with stirring 2.0 g. (0.007 mole) of α,α-diphenyl-2-pyrazineacetonitrile. The temperature was maintained at 90° C., and stirring was continued for about 12 hours. The reaction product mixture was poured onto crushed ice, the mixture was neutralized by the addition of solid sodium carbonate, and filtered. The light brown powder thus obtained was recrystallized from boiling methanol to yield a product weighing about 900 mg. and having a melting point of about 205–207° C. It was identified by elemental analysis and n.m.r. spectrum as α,α-diphenyl-2-pyrazineacetamide.

PREPARATION 5

2-(n-hexyl)pyrazine

Sodium amide, 15.6 g. (0.4 mole) was added to 500 ml. of anhydrous liquid ammonia, followed by the dropwise addition with stirring of 37.6 g. (0.4 mole) of methylpyrazine. The red solution was stirred for another half hour and then a solution of 60 g. (0.4 mole) of 1-bromopentane in 80 ml. of anhydrous ethyl ether was added dropwise over a period of about one-half hour. The reaction product mixture was diluted with a saturated aqueous solution of ammonium chloride, warmed gently until the ether began to reflux and then poured onto crushed ice and acidified with concentrated aqueous hydrochloric acid. The mixture was extracted several times with ether and the ether extracts retained. The aqueous layer was made basic with solid sodium carbonate and extracted several times with chloroform. The chloroform extracts were combined with the previously obtained ether extracts and dried over anhydrous magnesium sulfate, concentrated in vacuo to remove solvent, and distilled at reduced pressure to yield a product having a boiling point of about 108–115° C./14 mm. and identified by elemental analyses as 2-(n-hexyl)pyrazine.

Following the same general procedure as in Preparation 5 and using appropriate starting materials, the following compounds were prepared:

2-(cyclohexylmethyl)pyrazine. Boiling point 95° C./0.25 mm.

2-ethylpyrazine. Boiling point 145–153° C.

2-[bis(4-chlorobenzyl)methyl]pyrazine. Melting point 121–123° C.

2-phenethylpyrazine. Boiling point 100–110° C./0.1 mm.

2-dibenzylmethylpyrazine. Boiling point 145–155° C./0.1 mm. Melting point 65–66° C.

Following the same general procedure as in Preparation 5 and using 2-benzylpyrazine as one of the starting materials, the following compounds were prepared:

2-(α-cyclohexylbenzyl)pyrazine. Melting point 115–117° C.

2-(1-phenyl-n-hexyl)pyrazine. Boiling point 115–120° C./0.1 mm.

Following the same general procedure as in Preparation 5 and using 2-cyclohexylmethylpyrazine as one of the starting materials, the following compound was prepared:

2-dicyclohexylmethylpyrazine. Melting point 86–87° C.

Following the same general procedure as in Preparation 5 and using 2-ethylpyrazine as one of the starting materials, the following compound was prepared:

2-isopropylpyrazine. Boiling point 162–164° C.

We claim:

1. A method for controlling fungi which comprises applying to a locus of said fungi a fungicidal amount of a fungicidal substance selected from the group consisting of substituted pyrazines having the following formula and nonphytotoxic acid addition salts thereof:

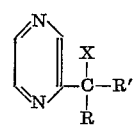

wherein

R is phenyl, halophenyl, thienyl, furyl, benzyl, $C_1$–$C_{10}$ alkyl, or $C_3$–$C_8$ cycloalkyl;

R' is R or hydrogen; and

X is hydrogen, hydroxyl, halo, amino, cyano, carboxamido, mercapto, $C_1$–$C_3$ alkoxy, $C_1$–$C_3$ alkylmercapto, $C_1$–$C_3$ alkylamino, or di($C_1$–$C_3$ alkyl)amino.

2. The method of claim 1 wherein said fungicidal substance is applied in the form of a composition containing within the range of from about 16 to about 600 p.p.m. or the fungicidally active ingredient.

3. The method of claim 1 wherein said fungicidal substance is α,α-diphenyl-2-pyrazinemethanol.

4. The method of claim 1 wherein said fungicidal substance is α,α-bis(4-chlorophenyl)-2-pyrazinemethanol.

5. The method of claim 1 wherein said fungicidal substance is α,α-diphenyl-2-pyrazineacetonitrile.

6. The method of claim 1 wherein said fungicidal substance is 2-(α-cyclohexylbenzyl)pyrazine.

7. The method of claim 1 wherein said fungicidal substance is 2-dicyclohexymethylpyrazine.

References Cited

UNITED STATES PATENTS

| | | | |
|---|---|---|---|
| 2,110,614 | 3/1938 | Vivian et al. | 260—267 |
| 2,649,397 | 8/1953 | Ballard | 424—251 |

OTHER REFERENCES

Chemical Abstracts, vol. 46, p. 11543g, 1952.

ALBERT T. MEYERS, Primary Examiner

D. J. FUNDERBUNK, Assistant Examiner